US006783066B2

(12) United States Patent
Livingston et al.

(10) Patent No.: US 6,783,066 B2
(45) Date of Patent: Aug. 31, 2004

(54) ON-PREMISES PAGING SYSTEM UTILIZING MOUNTED PAGERS HAVING A DATA INPUT DEVICE

(75) Inventors: James Livingston, Hickory Creek, TX (US); Russell P. Blink, Plano, TX (US); Kenneth J. Lovegreen, Lake Kiowa, TX (US)

(73) Assignee: Long Range Systems, Inc., Dallas, TX (US)

( * ) Notice: Subject to any disclaimer, the term of this patent is extended or adjusted under 35 U.S.C. 154(b) by 27 days.

(21) Appl. No.: 10/150,680

(22) Filed: May 17, 2002

(65) Prior Publication Data

US 2002/0190844 A1 Dec. 19, 2002

Related U.S. Application Data

(60) Provisional application No. 60/298,809, filed on Jun. 15, 2001.

(51) Int. Cl.[7] .................................................. G06K 5/10
(52) U.S. Cl. ...................................................... 235/380
(58) Field of Search ................................. 235/380, 492

(56) References Cited

U.S. PATENT DOCUMENTS 3,573,739 A * 4/1971 Zeitlin ........................ 340/5.32
4,399,330 A * 8/1983 Kuenzel .................. 455/456.1
4,569,421 A * 2/1986 Sandstedt .................... 186/39
4,722,053 A * 1/1988 Dubno et al. ................. 463/42
5,838,798 A * 11/1998 Stevens, III
5,845,263 A * 12/1998 Camaisa et al. .............. 705/27
5,854,595 A * 12/1998 Williams ................... 340/7.52
5,912,743 A * 6/1999 Kinebuchi et al. .......... 358/442
5,979,604 A * 11/1999 Pinna et al. .................. 186/39
6,003,770 A * 12/1999 Schilling ................. 235/382.5
6,115,695 A * 9/2000 Kern ........................... 705/23
D433,438 S * 11/2000 Wharram
6,164,531 A * 12/2000 Harris et al. ................ 235/380
6,301,564 B1 * 10/2001 Halverson .................... 705/15
6,415,555 B1 * 7/2002 Montague ................... 52/36.2

* cited by examiner

*Primary Examiner*—Mark Tremblay
(74) *Attorney, Agent, or Firm*—Steven W. Smith

(57) ABSTRACT

An on-premises restaurant paging system and method for paging a customer in the restaurant. A data token provided to the customer includes an encoded customer identifier which the customer inputs into one of a plurality of paging receivers that are mounted on different tables in the restaurant. Each of the paging receivers includes a data input device for reading the data token, and storing the customer identifier in a database. A programmable paging transmitter broadcasts a paging message in the restaurant that includes a broadcast customer identifier. Each of the fixed paging receivers receives the broadcast paging message, extracts the broadcast customer identifier, and compares the broadcast customer identifier with the customer identifier stored in its database. The paging receiver that determines a match generates an alert signal to alert the customer.

22 Claims, 4 Drawing Sheets

ON-PREMISES PAGING SYSTEM UTILIZING MOUNTED PAGERS HAVING A DATA INPUT DEVICE

PRIORITY STATEMENT UNDER 35 U.S.C. §119 (e) & 37 C.F.R. §1.78

This nonprovisional application claims priority based upon the prior U.S. provisional patent application entitled, "On-Premises Paging System Utilizing a Pager Having a Data Input Device," application No. 60/298,809, filed Jun. 15, 2001 in the names of James Livingston, Russell P. Blink, and Kenneth J. Lovegreen.

BACKGROUND OF THE INVENTION

1. Technical Field of the Invention

This invention relates to on-premises paging systems. More particularly, and not by way of limitation, the present invention is directed to an on-premises paging system that utilizes pagers mounted at different locations on the premises, each pager having a data input device through which a customer identifier may be input to the pager.

2. Description of Related Art

Many restaurants use a service method in which customers order their food at a central service counter, and then select their own table where they sit and wait for their food to be prepared. The customers may give their names to a server at the central counter, or the server may give each customer a number that will be called when the customer's food is ready. In either case, when the food is ready, a public address (PA) system is used to call out the name or number of the customer whose food is ready. The called customer then proceeds to the central counter and picks up his food. A disadvantage of the central service counter method is that many noisy PA system announcements must be made within the restaurant, thereby making the restaurant a less pleasant place to eat.

In other restaurants, customers must wait in a waiting area for a table to become available before they can sit down and order their food from a waitperson. Some of these restaurants utilize an on-premises paging system to alert waiting customers when their table is available. When the customer first arrives at the restaurant, he is given an on-premises pager by the receptionist who then enters the code number of the pager into the on-premises paging system. When the table is available, an on-premises paging transmitter pages the customer's pager with the proper code number, and the customer is alerted. A disadvantage of this paging method is that customers sometimes leave the restaurant before their table is ready, and they take their assigned pager with them. The loss of such pagers can be very expensive to the restaurant.

Some restaurants using the central service counter method have also attempted to utilize on-premises pagers to alert customers when their food is ready rather than using the noisy PA system. While this approach has been successful at lowering the noise level, it still suffers from the disadvantage that expensive pagers are lost.

It would be advantageous, therefore, to have an on-premises paging system for restaurants with central service counters that eliminates the necessity to make noisy PA announcements, and also eliminates the loss of expensive pagers. The present invention provides such a system.

SUMMARY OF THE INVENTION

In one aspect, the present invention is directed to an on-premises restaurant paging system for paging a customer in a restaurant having a central service counter. At the central service counter, a data token is provided to the customer. The token includes an encoded customer identifier which the customer inputs into one of a plurality of paging receivers that are mounted in a plurality of locations in the restaurant. For example, a paging receiver may be mounted on each table. Each of the paging receivers includes a data input device for reading the customer identifier from the data token when the customer presents the data token to the data input device. The customer identifier is then stored in a database in the paging receiver. A programmable paging transmitter broadcasts a paging message in the restaurant that includes a broadcast customer identifier. The fixed paging receivers receive the broadcast paging message and extract the broadcast customer identifier. A processor in each paging receiver compares the broadcast customer identifier with the customer identifiers stored in its database. When a paging receiver finds a match, the paging receiver generates an alert signal to alert the customer.

In another aspect, the present invention is directed to an on-premises pager that includes means for mounting the pager at a location in a business establishment; means for receiving a first identifier from a person to be alerted; and means for storing the first identifier received from the person. The pager also includes means for receiving from an external paging transmitter, a broadcast paging message that includes a second identifier; means for comparing the stored first identifier with the received second identifier; and means for generating an alerting signal for alerting the person when the first identifier matches the second identifier.

In yet another aspect, the present invention is directed to a method of paging a customer with an on-premises paging system. The method includes the steps of providing the customer with a data token on which a customer identifier is encoded, and reading the customer's customer identifier with a data input device at a particular one of a plurality of paging receivers mounted in one of a plurality of locations on the premises. The read customer identifier is then stored in a database in the particular paging receiver. This is followed by broadcasting to the plurality of paging receivers, a paging message that includes a broadcast customer identifier. Each of the paging receivers extracts the broadcast customer identifier from the paging message, and compares the broadcast customer identifier with the customer identifier stored in its database to determine whether there is a match. The particular paging receiver alerts the customer when the broadcast customer identifier matches the customer identifier stored in the database.

BRIEF DESCRIPTION OF THE DRAWINGS

The invention will be better understood and its numerous objects and advantages will become more apparent to those skilled in the art by reference to the following drawings, in conjunction with the accompanying specification, in which.

DETAILED DESCRIPTION OF EMBODIMENTS

Figure 1:
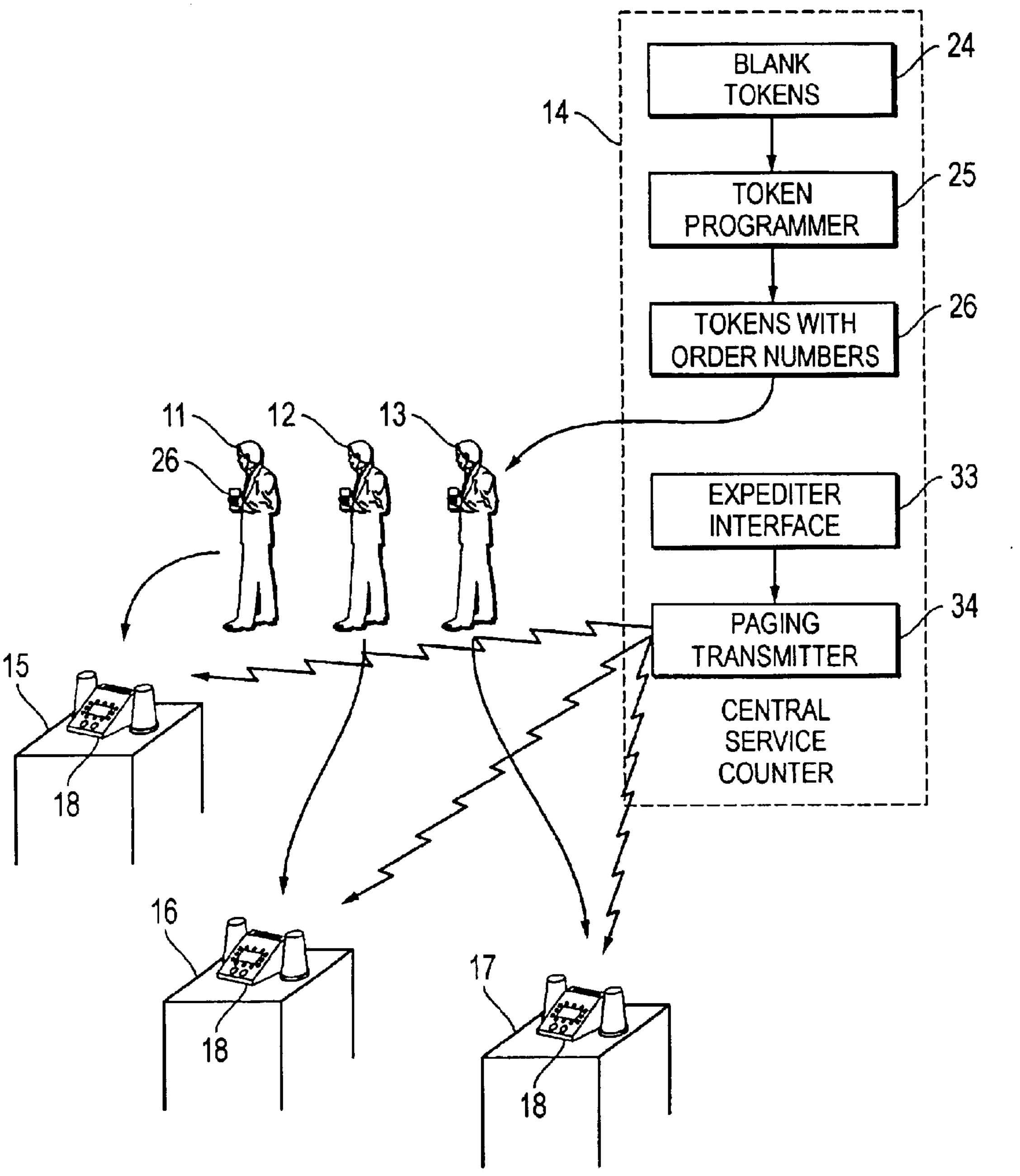
FIG. 1 is a simplified block diagram of the preferred embodiment of the on-premises paging system of the present invention.

FIG. 1 is a simplified block diagram of the preferred embodiment of the on-premises paging system of the present invention. The present invention is an on-premises paging system that utilizes pagers mounted at different locations on the premises, each pager having a data input device through which a customer identifier may be input to the pager. In restaurants using the central service counter method, customers 11–13 order their food at a central service counter 14, and then they select their own table 15–17 where they sit and wait for their food to be prepared. In the system of the present invention, an on-premises pager 18 is permanently mounted on each table. As shown and described in FIG. 2, each pager includes a data input device 19 such as a card reader, bar code scanner, keypad, etc. Each pager also includes a display screen 20, a set of alerting lights 21, a speaker 22, and a customer acknowledgment/reset button 23.

When the customer places an order at the central service counter 14, the server taking the order may place a blank data token 24 into a token programmer 25 which encodes a customer number on the token. Alternatively, the tokens may be preprogrammed, in which case the token programmer is not required. The server then gives the customer a programmed data token 26 and instructs them to input the data on the data token into the pager 18 mounted on the table that they select. The customer number is then stored in a customer-number memory in the pager. Thereafter, when the customer's order is ready, the customer number is broadcast by an on-premises paging transmitter, and the pager at the customer's table alerts the customer.

Figure 2:
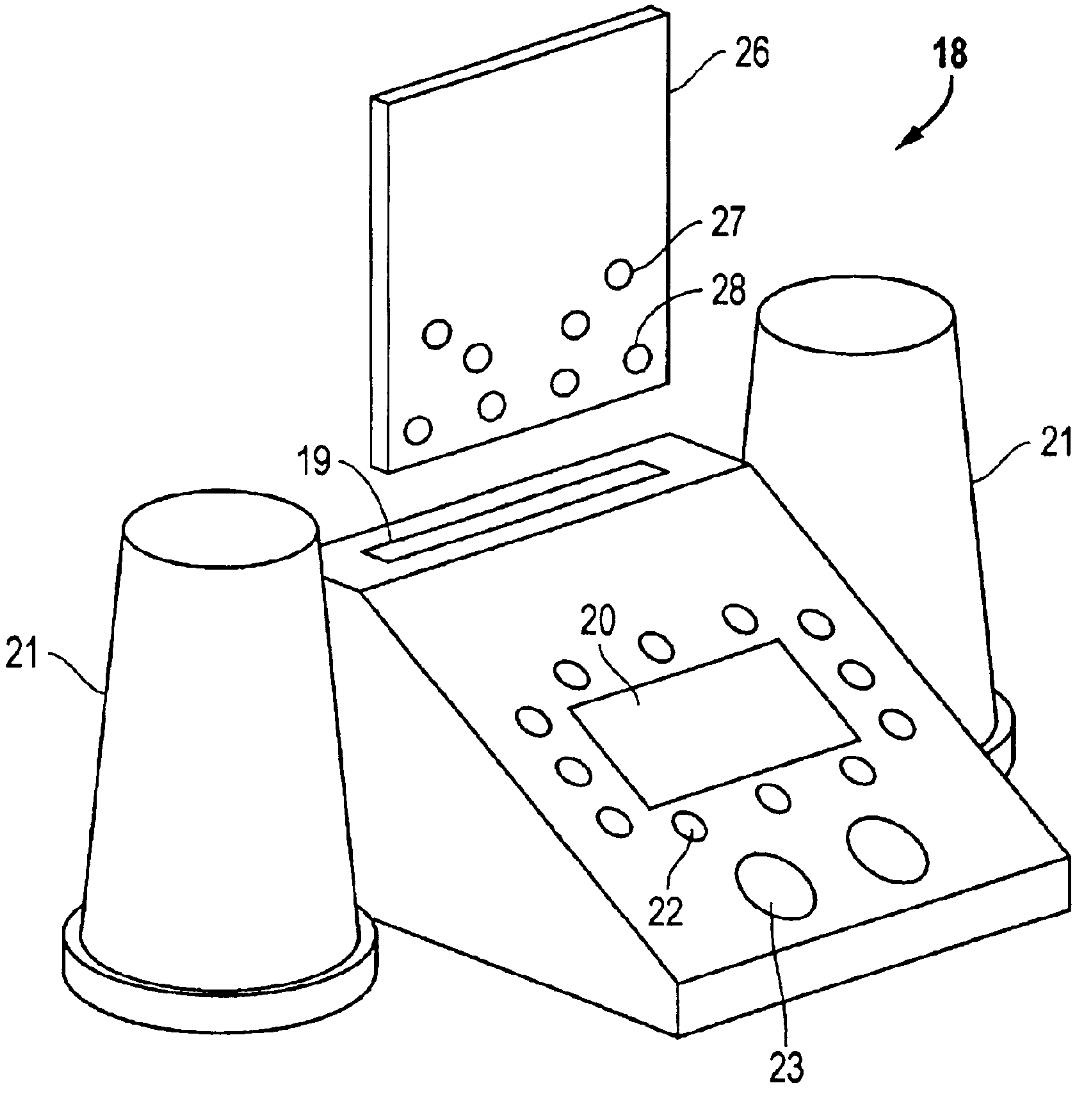
FIG. 2 is a perspective view of the preferred embodiment of the pager/data reader of the present invention.

FIG. 2 is a perspective view of the preferred embodiment of the pager 18. In the description herein, the pagers may be referred to as being mounted in fixed locations. However, it will be understood by those skilled in the art that the owner of the restaurant may have the means to relocate the pagers from one location to another. An essential feature of the pager, however, is that customers do not hand-carry the pagers, and customers cannot remove the pagers from their mounted locations without tools. In the preferred embodiment, the pagers are table-top pagers fixedly mounted to the tables in the restaurant.

In the preferred embodiment, the data tokens are preprogrammed plastic cards 26 having a series of holes 27 which are used to encode different customer numbers. A registration hole 28 is used to ensure that the data token is inserted into the data input device in the correct orientation. The data input device decodes the customer number by reading the pattern of holes. In one embodiment, when the card is placed in the data input device, a series of LEDs shine through the holes, and the light from each hole is detected by a series of detectors on the other side of the card. The presence of light is a logical value while the absence of light is an inverse logical value. Together, the values are interpreted as a customer number.

In other embodiments, the server may give the customer a plastic card with a magnetic strip that records the customer number. In this case, the data input device 19 in the pager is a magnetic card reader. Alternatively, the data input device in the pager may be a bar code reader, and the server may give the customer a receipt that has a bar code imprinted thereon containing the customer number. Other methods of inputting the customer number may also be utilized, such as optically read devices, smart cards, Radio Frequency Identifier (RFI) tokens, voice recognition programs, or mechanical bumps, holes, or slots. The data input device 19 may read the customer number as the card, token, or receipt is slid into, slid out of, and/or swiped across the data input device. In another embodiment, the customer is told or given a number at the central service counter, and the customer enters the number in the pager 18 through a keypad or microphone.

The display screen 20 may be an LCD or LED display, or any other display suitable for displaying a customer number. In the preferred embodiment, the display screen displays the customer number when the number is input into the pager, and then displays the number again when the customer number is paged. When the page is received, the alerting lights 21 flash to get the attention of the customers at the table. The speaker 22 may also provide an audible indication of the incoming page. When the customer recognizes his customer number on the display screen, he pushes the acknowledgment/reset button 23 which ends the alert and erases his number from the customer-number memory in the pager.

Figure 3:
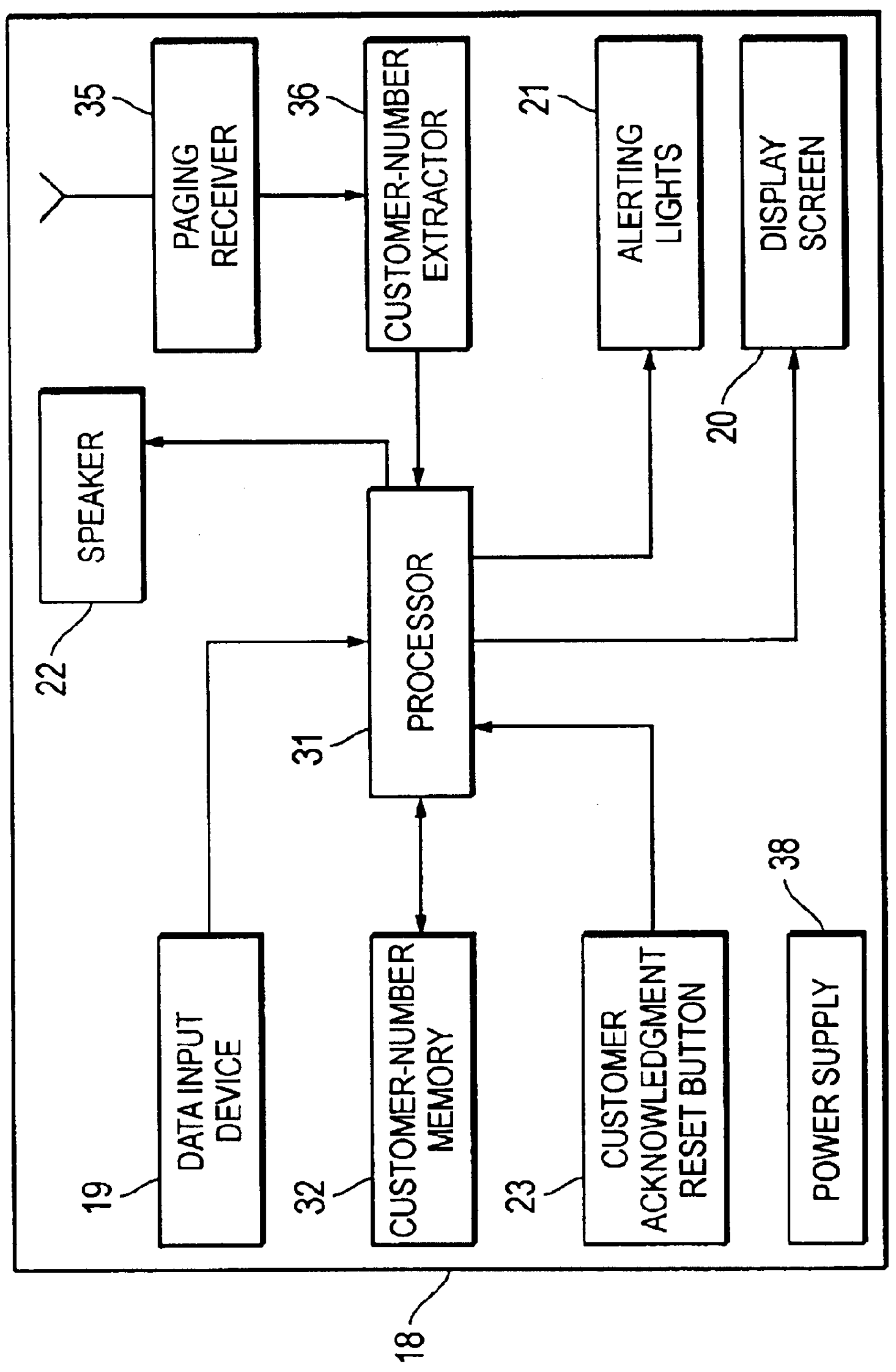
FIG. 3 is a simplified functional block diagram of the preferred embodiment of the pager/data reader of the present invention.

FIG. 3 is a simplified functional block diagram of the preferred embodiment of the pager/data reader 18 of the present invention. When the customer 11–13 selects a table 15–17, the data input device 19 is utilized to input the customer's identifier number into the pager 18. A processor 31 informs the customer of his customer number on the display screen 20, and stores the customer number in a customer-number memory 32. Additional members of the customer's party can then scan their tokens into the pager. The customer-number memory can store multiple customer numbers, and in the preferred embodiment, the customer-number memory can store up to sixteen (16) customer numbers. Each member of the party is informed of his/her customer number, and each customer number is stored in the customer-number memory.

When a particular customer's order is ready, the expediter at the central counter 14 (FIG. 1) uses an expediter interface 33 to use a paging transmitter 34 to broadcast a paging message that includes the assigned customer number. The pagers 18 mounted on each table receive the paging message through a paging receiver 35. A customer-number extractor 36 extracts the broadcast customer number from the received message and sends it to the processor 31. The processor of each particular pager then determines whether the broadcast customer number is stored in its customer-number memory. The particular pager that determines that the broadcast customer number is stored in its memory then alerts the customers at its table using the alerting lights 21 and the optional speaker 22, and then displays the broadcast customer number on the display screen 20. The customer acknowledgment/reset button 23 enables the customer to indicate that the customer has received the message. The pager then turns off the lights, clears the display screen, and deletes the customer number from the customer-number memory 32. The pager is powered by a power supply 38 which may be, for example, one or more batteries.

Figure 4:
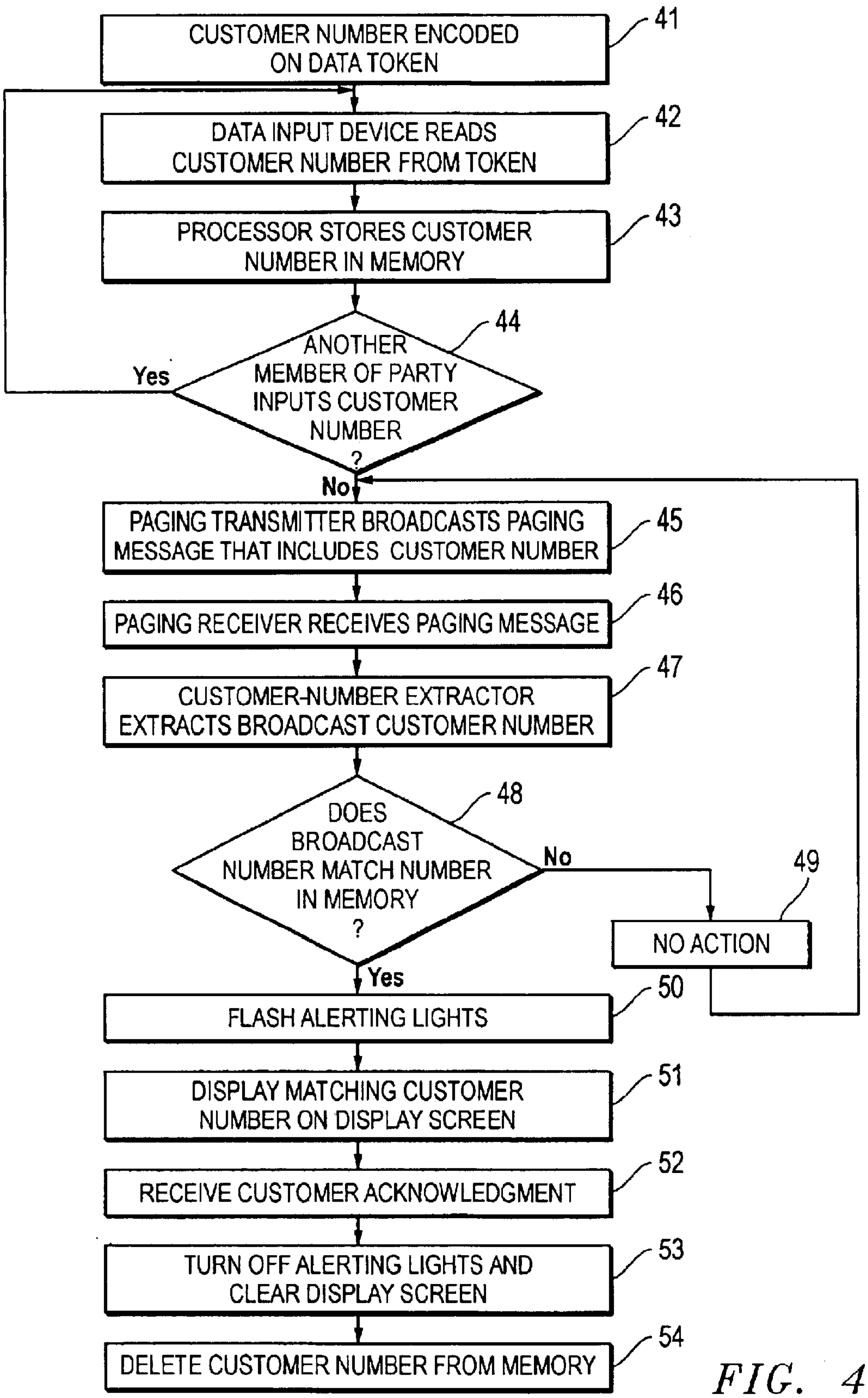
FIG. 4 is a flow chart of an exemplary process performed by the pager/data reader when receiving a paging message and alerting a customer.

FIG. 4 is a flow chart of an exemplary process performed by the pager/data reader 18 when receiving a paging message and alerting a customer. At step 41, a customer number may be encoded on a data token 26 at the central service counter 14. Alternatively, a pre-recorded data token is provided to the customer. The customer then takes the token to a table, and the data input device 19 reads the customer number from the token at step 42. At step 43, the processor 31 stores the customer-number in the customer-number memory 32. The number may be displayed at this time on the display screen 20 to provide feedback to the customer that the number has been entered. At step 44, it is then determined whether another member of the dining party inputs a customer number through the data input device. If so, the process returns to step 42 where the data input device reads the customer number from the token, and the processor stores the customer-number in the customer-number memory at 43. When all of the customer numbers at the table have been entered, the pager waits for a broadcast paging message.

At step 45, the paging transmitter at the central service counter broadcasts a paging message that includes a customer number. At 46, the paging receiver 35 receives the message, and the customer-number extractor 36 extracts the broadcast customer number at 47. At step 48, the processor 31 determines whether or not the broadcast customer number matches any of the customer numbers stored in its memory 32. If not, the process moves to step 49 where no action is taken. The process then returns to step 45 where the pager continues to wait for a broadcast paging message. If the broadcast customer number matches one of the customer numbers stored in its memory at step 48, the process moves to step 50 where the alerting lights 21 are flashed to get the attention of the customers at the table. At step 51, the customer number matching the broadcast customer number is displayed on the display screen 20, and at 52, the customer having the displayed customer number pushes the customer acknowledgment/reset button 23. At 53, the processor turns off the alerting lights and clears the display. At 54, the customer number is then deleted from the customer-number memory. This process continues until all of the customers at the table have been alerted.

In this manner, the necessity to make noisy PA announcements is eliminated. The loss of expensive pagers is also eliminated since the pagers are permanently mounted on the tables, and the customers are given only plastic cards costing a few cents, or bar-coded receipts which essentially cost nothing.

It is thus believed that the operation and construction of the present invention will be apparent from the foregoing description. While the system, apparatus, and method shown and described has been characterized as being preferred, it will be readily apparent that various changes and modifications could be made therein without departing from the scope of the invention as defined in the following claims.

What is claimed is:

1. An on-premises restaurant paging system for paging a customer in a restaurant, said paging system comprising:

a data token that is provided to the customer, said token having a customer identifier for the customer encoded thereon;

a paging transmitter that is programmable to broadcast a paging message in the restaurant, said message including a broadcast customer identifier; and a plurality of paging receivers mounted in a plurality of locations in the restaurant, said paging receivers including:

a data input device for reading the customer identifier from the data token when the customer presents the data token to the data input device;

a database for storing the customer identifier read from the data token;

a receiver for receiving the broadcast paging message and extracting the broadcast customer identifier therefrom;

a processor for comparing the broadcast customer identifier with the customer identifier stored in the database; and means for alerting the customer when the broadcast customer identifier matches the customer identifier stored in the database.

2. The on-premises restaurant paging system of claim 1 wherein the data token is a card having a plurality of apertures forming a unique pattern therein, and the paging receivers include an optical reader that recognizes the pattern and determines a customer identifier therefrom.

3. The on-premises restaurant paging system of claim 1 wherein the data token includes a magnetic strip on which the customer identifier is magnetically encoded, and the paging receivers include a magnetic card reader that reads the magnetic strip and determines a customer identifier therefrom.

4. The on-premises restaurant paging system of claim 1 wherein the data token includes a bar code that encodes the customer identifier, and the paging receivers include a bar code reader that reads the bar code and determines a customer identifier therefrom.

5. The on-premises restaurant paging system of claim 1 wherein the paging receivers also include a customer acknowledgment reset button electronically connected to the processor, wherein pushing said reset button causes the processor to delete the customer identifier stored in the database.

6. The on-premises restaurant paging system of claim 1 wherein the means for alerting the customer includes means for visually alerting the customer.

7. The on-premises restaurant paging system of claim 6 wherein the means for alerting the customer also includes means for audibly alerting the customer.

8. The on-premises restaurant paging system of claim 1 wherein the database stores a plurality of customer identifiers, and the processor compares the broadcast customer identifier with the plurality of customer identifiers stored in the database and determines whether there is a match.

9. An on-premises restaurant pager comprising:

means for mounting the pager on a customer dining table in a restaurant;

means for receiving a first identifier from a customer seated at the table;

means for storing the first identifier received from the customer means for receiving a broadcast paging message from an on-premises paging transmitter, said paging message including a second identifier;

means for comparing the stored first identifier with the received second identifier; and means for generating an alerting signal for alerting the customer when the first identifier matches the second identifier.

10. The on-premises restaurant pager of claim 9 wherein the means for receiving a first identifier is a keypad through which the person enters the first identifier.

11. The on-premises restaurant pager of claim 9 wherein the means for receiving a first identifier includes a reader for reading the first identifier from a data token when the data token is presented to the means for receiving the first identifier.

12. The on-premises restaurant pager of claim 11 wherein the means for receiving a first identifier is an optical reader that recognizes a pattern of apertures in an input card and determines the first identifier therefrom.

13. The on-premises restaurant pager of claim 11 wherein the means for receiving a first identifier is a magnetic card reader that reads the first identifier from a magnetic strip on a card presented to the means for receiving the first identifier.

14. The on-premises restaurant pager of claim 11 wherein the means for receiving a first identifier is a bar code reader that reads the first identifier from a bar code on the data token.

15. The on-premises restaurant pager of claim 9 further comprising means for resetting the pager when the first identifier matches the second identifier, and an alert signal has been generated.

16. The on-premises restaurant pager of claim 9 wherein the means for generating an alerting signal includes means for generating a visual alerting signal.

17. The on-premises restaurant pager of claim 14 wherein the means for generating an alerting signal also includes means for generating an audible alerting signal.

18. The on-premises restaurant pager of claim 9 wherein the means for storing the first identifier stores a plurality of identifiers, and the means for comparing the stored first identifier with the received second identifier compares the second identifier in the paging message with the plurality of identifiers stored in the database and determines whether there is a match.

19. A method of paging a restaurant customer with an on-premises paging system, said method comprising the steps of:

providing the customer with a data token on which a customer identifier is encoded;

reading the customer's customer identifier with a data input device at a particular one of a plurality of paging receivers mounted on one of a plurality of dining tables in the restaurant;

storing the read customer identifier in a database in the particular paging receiver;

broadcasting with an on-premises paging transmitter, a paging message to the plurality of paging receivers, said paging message including a broadcast customer identifier;

extracting by each paging receiver, the broadcast customer identifier from the paging message;

determining by the particular paging receiver, whether the broadcast customer identifier matches the customer identifier stored in the database; and alerting the customer by the particular paging receiver when the broadcast customer identifier matches the customer identifier stored in the database.

20. The method of paging a restaurant customer of claim 19 wherein the step of providing the customer with a data token includes providing the customer with an optically read data card.

21. The method of paging a restaurant customer of claim 19 wherein the step of providing the customer with a data token includes providing the customer with a magnetically read data card.

22. The method of paging a restaurant customer of claim 19 wherein the step of providing the customer with a data token includes providing the customer with a receipt with a bar code printed thereon.

* * * * *